(12) United States Patent
Kim

(10) Patent No.: US 7,226,182 B2
(45) Date of Patent: Jun. 5, 2007

(54) LIGHTING BLOCK USING SOLAR CELLS

(75) Inventor: Dae-Won Kim, Suwon (KR)

(73) Assignee: Samsung SDI Co., Ltd, Suwon-si (KR)

( * ) Notice: Subject to any disclaimer, the term of this patent is extended or adjusted under 35 U.S.C. 154(b) by 112 days.

(21) Appl. No.: 10/916,580

(22) Filed: Aug. 10, 2004

(65) Prior Publication Data
US 2005/0039789 A1 Feb. 24, 2005

(30) Foreign Application Priority Data
Aug. 20, 2003 (KR) ............... 10-2003-0057686

(51) Int. Cl.
*F21L 4/00* (2006.01)
(52) U.S. Cl. ............ 362/183; 362/159; 362/166; 257/88; 136/251; 52/173.3
(58) Field of Classification Search ........... 362/183, 362/159, 166; 257/88; 136/251; 52/173.3
See application file for complete search history.

(56) References Cited

U.S. PATENT DOCUMENTS

| | | | |
|---|---|---|---|
| 6,339,188 B1 * | 1/2002 | Voelkner | 136/251 |
| 2004/0004827 A1 * | 1/2004 | Guest | 362/31 |
| 2004/0238833 A1 * | 12/2004 | Nakata | 257/88 |

FOREIGN PATENT DOCUMENTS

| | | |
|---|---|---|
| JP | 05225801 A * | 9/1993 |
| JP | 10-219638 | 8/1998 |
| JP | 11-175014 | 7/1999 |
| JP | 2000-290945 | 10/2000 |
| JP | 2001-115595 | 4/2001 |
| JP | 2003039487 A * | 2/2003 |

OTHER PUBLICATIONS

Patent Abstract of Japan, Publication 10-219638, Published Aug. 18, 1998, in the name of Ogawa.
Patent Abstract of Japan, Publication 11-175014, Published Jul. 2, 1999, in the name of Saito.
Patent Abstract of Japan, Publication 2000-290945, Published Oct. 17, 2000, in the name of Tagawa, et al.
Patent Abstract of Japan, Publication 2001-115595, Published Apr. 24, 2001, in the name of Tagawa, et al.

* cited by examiner

*Primary Examiner*—Renee Luebke
*Assistant Examiner*—Mary Zettl
(74) *Attorney, Agent, or Firm*—Christie, Parker & Hale, LLP

(57) ABSTRACT

A lighting block using solar cells. A case covers an outer surface of the lighting block and includes a light transmission section, light being emitted and received through the light transmission section. A light emitting assembly is mounted within the case next to an inner surface of the light transmission. The light emitting assembly allows the transmission of sunlight therethrough. A solar cell assembly is mounted within the case next to the light emitting assembly. The solar cell assembly receives sunlight passing through the light transmission section and the light emitting assembly, and generates electric power. A capacitor is installed within the case and stores the electric power generated by the solar cell assembly. A controller installed within the case controls the supply of the stored electric power to the light emitting assembly.

16 Claims, 4 Drawing Sheets

LIGHTING BLOCK USING SOLAR CELLS

CROSS-REFERENCE TO RELATED APPLICATION

This application claims priority to and the benefit of Korea Patent Application No. 2003-0057686 filed on Aug. 20, 2003 in the Korean Intellectual Property Office, the content of which is incorporated herein by reference.

BACKGROUND OF THE INVENTION (a) Field of the Invention

The present invention relates to a lighting block that uses solar cells. More particularly, the present invention relates to a lighting block that uses one surface for both a light receiving area through which solar cells receive light and a light emitting area through which light is emitted using energy generated by the solar cells, thereby allowing the size of the light emitting area and the light receiving area to be maximized.

(b) Description of the Related Art

Tiles or blocks mounted in the ground or in walls of a building may be made into lighting tiles or lighting blocks that emit light. Lighting tiles and lighting blocks may have a decorative purpose for beautifying an area at night, or may act to simply illuminate an area at night (the term "lighting blocks" will be used in the following with the understanding that this may also mean lighting tiles).

With conventional lighting blocks, fluorescent lights are mounted to the inside of a surface section of a transparent plate-shaped block. During installation of the lighting blocks, wiring is performed to electrically connect the fluorescent lights to an external power source.

However, the fluorescent lights used in such conventional lighting blocks have a limited life such that they need to be periodically replaced. Also, the wiring operation to connect the fluorescent lights to an external power source can be complicated. Finally, the lighting blocks discontinue operation if there is a power failure.

Lighting blocks that use solar cells have been developed to overcome these problems. With lighting blocks that use solar cells, the solar cells receive sunlight during daytime hours to generate electric power. This electric power is stored in storage cells and the power in the storage cells is then used at night to power the lighting blocks.

Japanese Laid-Open Patent Nos. 1998-219638, 1999-175014, 2000-290945, and 2001-115595 disclose such lighting blocks that use solar cells.

However, with such conventional assemblies, a surface of the lighting blocks is divided into a light receiving section that receives solar light and a light emitting section that emits light. In more detail, with respect to Japanese Laid-Open Patent Nos. 1998-219638 and 1999-175014, solar cells are mounted to a center, lower area of a front surface of the lighting blocks, and sunlight is received through the center section. Further, light-emitting diodes are mounted in a lower section of edges of the front surface of the lighting blocks such that light is emitted through the edge portions.

In Japanese Laid-Open Patent No. 2000-290945, edges of a front surface of the lighting blocks form a light receiving section, and a center thereof forms a light emitting section.

Since the light receiving and emitting sections are limited to a center or edges of a total front surface of the lighting blocks, the light receiving and emitting sections need to be enlarged.

In Japanese Laid-Open Patent No. 2001-115595, a front surface of the lighting blocks acts as a light receiving section, and a rear surface of the lighting blocks forms a light emitting section. As a result of this structure, the lighting blocks are limited in their use to specific areas where both the front and rear surfaces are exposed such as in a roof or an awning. That is, if the lighting blocks with this configuration are mounted in the floor or as wall-mounted devices, one of either the front surface or the rear surface is covered and therefore unable to perform its function.

SUMMARY OF THE INVENTION

In accordance with embodiments of the present invention a lighting block is provided that uses solar cells in which a light emitting area is enlarged. Embodiments of the present invention provide a lighting block in which no limitations are placed on either the installment location or installment method while realizing increases in light emitting area. Embodiments of the present invention also provide a lighting block that uses solar cells in which one surface is used for both the light emitting area and a light receiving area.

In one embodiment, the present invention is a lighting block using solar cells including a case covering an outer surface of the lighting block and including a light transmission section. Light is emitted and received through the light transmission section. A light emitting assembly is mounted within the case next to an inner surface of the light transmission. The light emitting assembly allows the transmission of sunlight therethrough. A solar cell assembly is mounted within the case next to the light emitting assembly. The solar cell assembly receives sunlight passing through the light transmission section and the light emitting assembly, and generates electric power. A capacitor is installed within the case and stores the electric power generated by the solar cell assembly. A controller is installed within the case and controls the supply of the stored electric power to the light emitting assembly.

The light emitting assembly may include a light guide plate that is mounted next to an inner surface of the light transmission and light sources that irradiate light through a side surface of the light guide plate.

The light guide plate may be mounted in contact with a rear surface of the light transmission section or in separation from the inner surface of the light transmission section at a predetermined distance.

When the light guide plate is mounted separated from the inner surface of the light transmission section at a predetermined distance, a transparent material, such as ethylene vinyl acetate (EVA), is filled in the distance between the light guide plate and the inner surface of the light transmission section.

The light guide plate may be made of a transparent material that is one of polycarbonate, ethylene vinyl acetate (EVA), and acrylic resin including poly methyl metacrylate (PMMA).

The light guide plate includes a light reflecting assembly that is substantially parallel to the light transmission section and is realized through a surface of the light guide plate farthest from the light transmission section. The light guide plate further includes a light scattering assembly that is substantially parallel to the light transmission section and realized through a surface of the light guide plate that is closest to the light transmission section.

The light reflecting assembly may be realized through one of protrusions, a mirror sheet or a metal film.

The light scattering assembly may be a light scattering sheet, with minute protrusions and depressions formed thereon by a sandblast process.

A dichroic mirror may be coated on a surface of the light guide plate that is farthest from the light transmission section and substantially parallel to the same, the dichroic mirror selectively reflecting light of a specific wavelength.

The lighting sources are light-emitting apparatus including light bulb and light-emitting diodes.

The case may be made of one of glass and polycarbonate.

The solar cell assembly is realized through solar cells that are mounted at a predetermined distance from the light emitting assembly.

The solar cell assembly may include a plurality of solar cells.

The capacitor is electrically connected with the solar cell assembly using an electric wire.

The controller is electrically connected with the light emitting assembly using an electric wire.

DETAILED DESCRIPTION

With reference to FIGS. 1A–4, an exterior of the lighting block is defined by case 11. A light emitting assembly, solar cells, a capacitor, and a controller are mounted within case 11.

Light transmission section T that allows the passage of light therethrough is formed in case 11. Both the reception of light and the emission of light are realized through the light transmission section T. To increase a light receiving efficiency and a light emitting efficiency, light transmission section T is made as large as possible. A typical case size is 20 inches in the diagonal direction. For example, in FIGS. 1A and 1B, a box type case 11 is shown having substantially a quadrilateral cross section, and light transmission section T occupies nearly all of an upper surface of case 11. Light transmission section T occupies all of an upper surface of case 11 except edge portions (areas which the thickness of the side plate of case 11 makes) and light source portions. The thickness of the side plate of case 11 is determined by the material of case 11 and the light source portions are negligibly small.

The light emitting assembly, solar cells, capacitor, and controller are mounted within the case in a state where one side (e.g., a bottom side) of case 11 is removed. Cover 12 is then replaced and adhesive 13 is used to seal cover 12 to case 11.

Entire case 11 may be made of a material that allows the transmission of light therethrough, or may be structured such that only transmission section T is made of a material that allows light to pass therethrough, with the remainder of the material of case 11 being opaque. Case 11 of FIGS. 1A and 1B, or an insert portion thereof in the transmission section T, may be made of a material such as glass or polycarbonate, which allow the transmission of light therethrough and are highly durable.

Figure 1A:
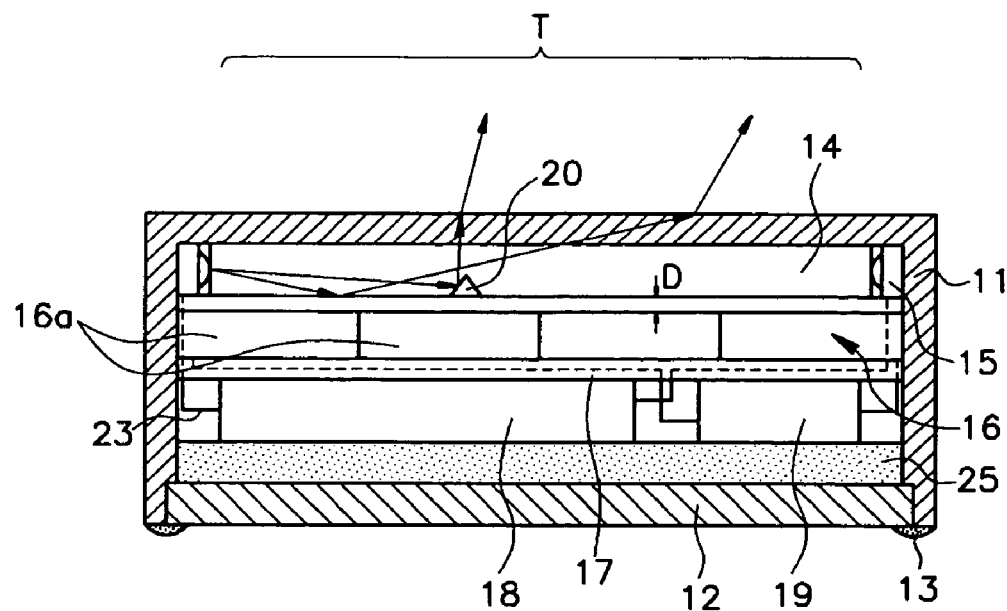
FIGS. 1A and 1B are sectional views of exemplary lighting blocks using solar cells according to embodiments of the present invention.
Figure 1B:
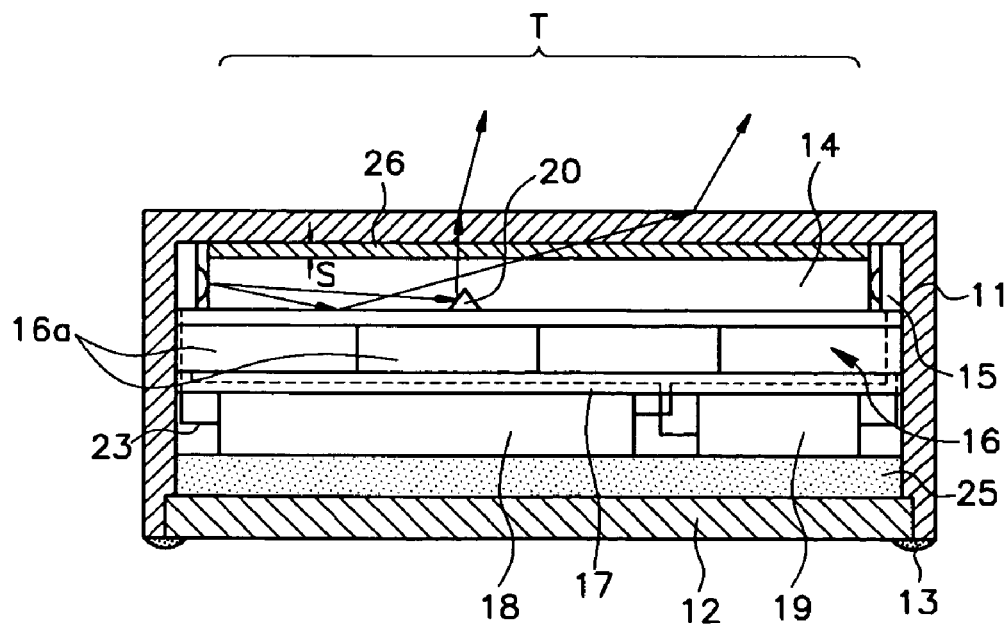

The light emitting assembly is mounted within case 11 next to light transmission section T. The light emitting assembly includes light guide plate 14 that is mounted substantially parallel to light transmission section T and made of a material through which light may be transmitted, and light sources 15 that irradiate light through side surfaces of light guide plate 14. FIGS. 1A and 1B show examples of how a light emitting assembly, a solar cell assembly, a capacitor and a controller are mounted in a case. As shown in FIGS. 1A and 1B, light guide plate 14, solar cell assembly 16, and mounting substrate 17 on which capacitor 19 and controller 18 are mounted, are perfectly fitted into case 11 using buffer 25, such as a sponge, such that the size of the assemblies and the mounting substrate is designed to be same with that of the inner space of the case. Light source 15 can be mounted in the grooves formed to the light guide plate 14. Electric wires 23 connect the light source 15 with the controller 18 and the solar cell assembly 16, having a plurality of solar cells 16a, with the capacitor 19, respectively.

Light guide plate 14 may be mounted separate from light transmission section T at a predetermined distance, while as close to light transmission section T as possible. In one embodiment depicted in FIG. 1A, light guide plate 14 is mounted closely contacting an inner surface of light transmission section T. On the other hand, referring to FIG. 1B, distance S at the light guide plate 14 is spaced from an inner surface of light transmission section T and can be smaller than 1 centimeter. Transparent material 26 can be filled in the space indicated by distance S between light guide plate 14 and the inner surface of light transmission section T. When light guide plate 14 is mounted separated from the inner surface of light transmission section T at a predetermined distance, a transparent material like a ethylene vinyl acetate (EVA) is filled in the distance between light guide plate 14 and the inner surface of light transmission section T.

Figure 2:
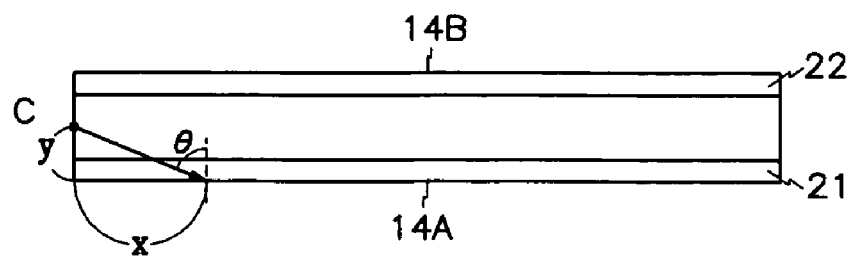
FIG. 2 is a sectional view of a light guide plate.

Referring to FIG. 2, light guide plate 14 further includes a light reflection assembly and a light scattering assembly. In more detail, the light reflection assembly is realized through a light reflection surface 14A which is farthest from light transmission section T substantially being parallel to light transmission section T, and the light scattering assembly is realized through a light scattering surface 14B which is closest to light transmission section T substantially being parallel to light transmission section T.

Referring to FIGS. 1A, 1B and 2, protrusions 20 may be formed in light reflection surface 14A as the light reflection assembly, or mirror sheet or metal film 21 may be coated to improve light reflection. Minute protrusions and depressions (not shown) may be formed in light scattering surface 14B by a sandblast process, or a light scattering sheet 22 as seen in FIG. 2. Light scattering sheet 22 is a layer that is coated on the light guide plate 14 to improve light scattering.

Figure 3A:
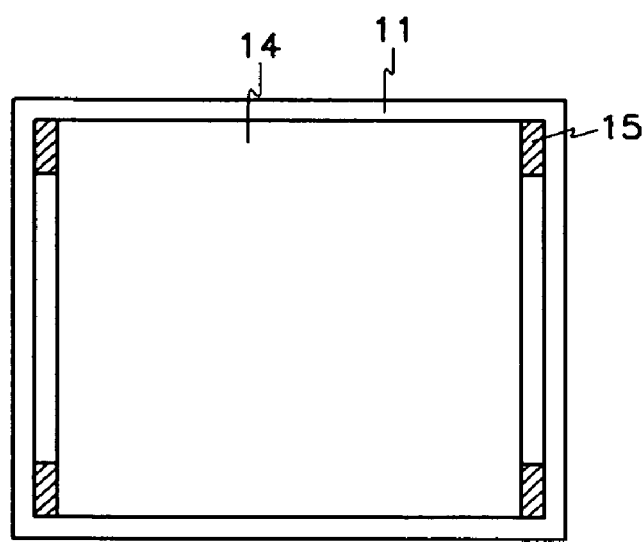
FIGS. 3A, 3B, and 3C are plan views of the lighting blocks of FIGS. 1A and 1B showing different arrangements for light sources.
Figure 3B:
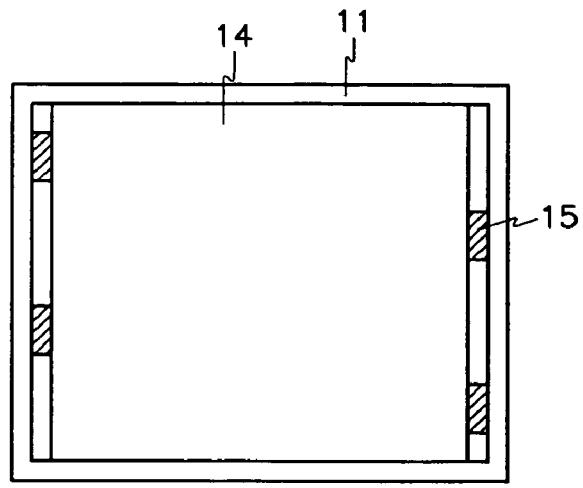

If light guide plate 14 is mounted closely contacting the inner surface of light transmission section T, the inner surface of light transmission section T is sandblasted such that all light rays exiting from light guide plate 14 illuminate through lighting transmission section T without light loss A plurality of light sources 15 may be used and suitably arranged depending on the size and shape of the lighting block. For example, light sources 15 may be mounted adjacent to all four sides of light guide plate 14 as shown in FIG. 3A. Preferably, the distribution of protrusions 20 formed in light reflection surface 14A and the arrangement of light sources 15 are determined by making considerations for both at the same time such that light is uniformly emitted from light guide plate 14.

For example, with reference to FIG. 3A, light sources 15 may be mounted to each corner area of light guide plate 14 that is shown to be a quadrilateral shape. Alternatively, with reference to FIG. 3B, light sources 15 may be arranged in an alternating manner to side areas of light guide plate 14.

Figure 3C:
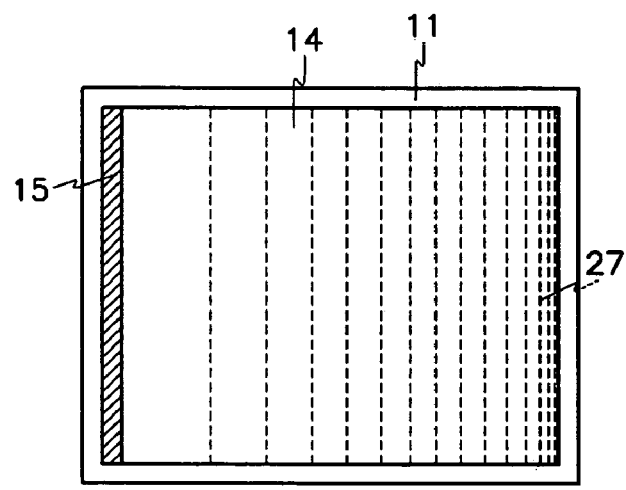
Figure 4:
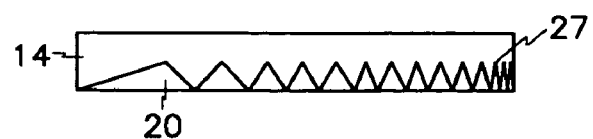
FIG. 4 shows an example of an embodiment of the present invention with protrusions having slopes of increasing steepness.

If the size of the lighting block is small, for example, 2–3 inches in a diagonal direction, sufficient uniform lighting can be obtained although light sources 15 are arranged in a line along one side of light guide plate 14 as shown in FIG. 3C. In this case, protrusions 20 are distributed more densely as the distance to light sources 15 is increased to thereby make uniform the light emitted from light guide plate 14. This may mean that as the distance to light sources 15 is increased, so is the number of protrusions 20 (i.e., protrusions 20 are more densely packed together), or that as the distance to light sources 15 is increased, distances between apexes 27 of adjacent protrusions 20 is decreased (i.e., protrusions 20 are made having increasingly steeper slopes). FIG. 4 shows an example of protrusions having slopes of increasing steepness.

Various lighting devices such as light bulbs and light-emitting diodes may be used for light sources 15. Light-emitting diodes (LEDs) are preferable to light bulbs since they last longer and generate less heat. Fiber optics may also be employed for the transmission of light together with the lighting apparatuses.

LEDs emit light having a specific wavelength. That is, there may be blue, green, and red LEDs. If it is desired to emit light of such specific wavelengths from the lighting block, a dichroic mirror that selectively reflects light of a specific wavelength may be coated on light reflection surface 14A of light guide plate 14.

Acrylic resin such as poly methyl metacrylate (PMMA) may be used as a transparent material for light guide plate 14. It is also possible to use ethylene vinyl acetate (EVA) or polycarbonate being commonly used in place of glass.

Further, the smaller the difference in the refractive indexes between light guide plate 14 and case 11, the less the light loss in an interfaces between these two elements. Therefore, it Is preferable that light guide plate 14 be made of a material having as small a difference in refractive index with case 11.

For example, in the case where PMMA is used for light guide plate 14, the refractive index of PMMA is approximately 1.5, which is almost identical to the refractive index of the glass or polycarbonate used for case 11. As a result, there is almost no refraction of light between light guide plate 14 and case 11.

Solar cell assembly 16 is mounted next to the light guide plate. Solar cell assembly 16 receives sunlight that passes through light transmission section T and light guide plate 14, and generates power.

Solar cell assembly 16 may be mounted closely contacting a surface of light guide plate 14 which is farthest from light transmission section T, while some distance from the light guide plate may be implemented in some embodiments. Solar cell assembly 16 may be mounted separated at a predetermined distance from light guide plate 14 to protect it from heat generated during operation of the solar cell. For example, distance D between solar cell assembly 16 and light guide plate 14 as shown in FIG. 1A can be smaller than 1 centimeter.

Further, with this separation of solar cell assembly 16 from light guide plate 14 at a predetermined distance, most of the light, when entering the air in this separation space from light guide plate 14, is unable to be transmitted to the air and is instead reflected from light reflection surface 14A of light guide plate 14.

That is, when light passes into the air in the space from light guide plate 14, which has a greater refractive index than air (a 1.5 refractive index for PMMA, for example, compared to a refractive index of 1 for air), all of the entering light is reflected if the angle of incidence is greater than a critical angle. The critical angle (θ) as seen in FIG. 2 at which total reflection is realized has the relation as indicated below.

$$\sin\theta = \text{refractive index of air/refractive index of light guide plate} = 1/1.5 = 0.67 \qquad \text{Equation 1}$$

The critical angle θ that satisfies sinθ=0.67 is slightly over 42 degrees. This indicates that light landing at an incidence angle of 42 degrees or more will be totally reflected.

Still referring to FIG. 2, with light sources 15 emitting light from a center point C of a cross-sectional width of light guide plate 14, if y is a distance of half of the cross-sectional width of light guide plate 14 (i.e., a distance from center point C to an outermost surface of light reflection surface 14A), and x is a distance along the outermost surface of light reflection surface 14A from an edge of light guide plate 14 along which point C is drawn to a point on light reflection surface 14A where the light emitted from center point C lands, total reflection occurs if x is greater than approximately 0.9y.

Since the light emitted from the side of light guide plate 14 satisfies the above condition, that is, it lands at an incidence angle of 42 degrees or more, most of the light will be totally reflected. Protrusions 20 formed in light reflection surface 14A of light guide plate 14 also aid in the reflection of light.

Light passing through light transmission section T and light guide plate 14 is collected and made into electromotive force in solar cell assembly 16. Although there may be partial loss of the sunlight that enters solar cell assembly 16 by being scattered and reflected by protrusions 20 and the dichroic mirror coating formed on light guide plate 14, most of the sunlight enters solar cell assembly 16. Solar cell assembly 16 is realized through the combination of a plurality of solar cells in parallel.

Figure 5:
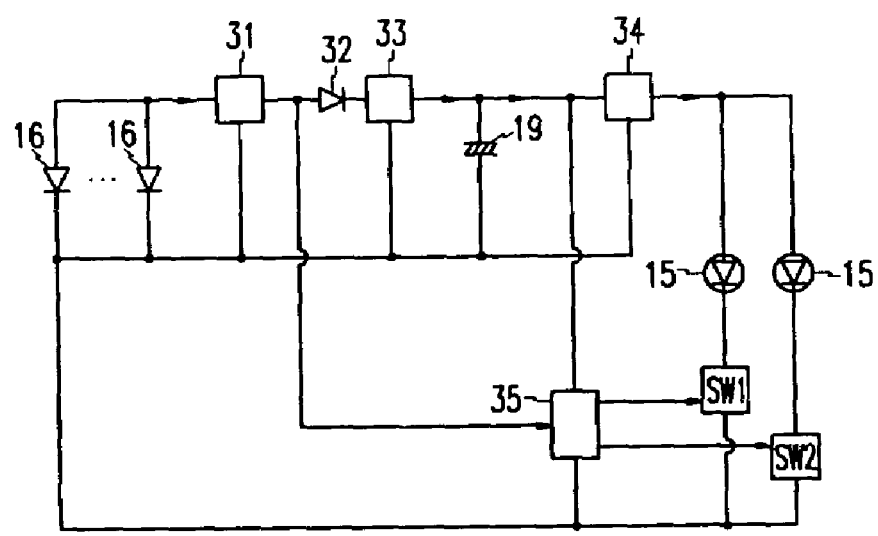
FIG. 5 shows an example of an electrical circuit in block diagram from depicting an embodiment of the present invention.

Further, capacitor/controller unit 18 is mounted within case 11 The capacitor part stores electrical power generated in solar cell assembly 11, while the controller part controls the supply of power stored in the capacitor to the light emitting assembly. FIG. 5 shows an example of electrical circuit/block diagram. As mentioned above, capacitor 19 and controller 18 are mounted on mounting substrate 17. Further, over-voltage protecting circuit 31, reverse current preventing diode 32, voltage stabilizing circuit 33, voltage raising circuit 34, emission controlling circuit 35, and switching devices SW1 and SW2, comprise controller 18.

Secondary batteries or an electric dual layer capacitor may be used for the capacitor. The electric dual layer condenser is preferred over secondary batteries since it has a longer life and is more reliable.

An operation of the lighting block structured as described above will now be explained.

During daylight hours, sunlight passes through light transmission section T of case 11 and light guide plate 14, and enters solar cell assembly 16. With light transmission section T formed over an entire upper or outer surface of the lighting block, the light receiving area corresponds to almost all this entire upper or outer surface of the light block.

Solar cell assembly 16 collects the sunlight, generates electromotive force, and stores the same in the capacitor part of capacitor/controller unit 17.

If the area around the lighting block becomes dark, the controller part of capacitor/controller unit 17 sends an ON signal to light sources 15. As a result, power stored in the capacitor is transmitted to light sources 15 and light sources 15 then operate to emit light.

The light emitted from light sources 15 passes through the side surfaces of light guide plate 14 and lands on light reflection surface 14A thereof. Most of the light is reflected from light reflection surface 14A, and this light is scattered in light scattering surface 14B to pass through light transmission section T and illuminate an area in front of the lighting block.

With such a structure, the light emitting area and the light receiving area are identical and correspond to nearly the entire front surface of the lighting block.

In the lighting block of the present invention described above, the same region is used for both the light receiving area that collects sunlight and the light emitting area through which light is emitted using power generated by the solar cells. Therefore, the size of the light emitting region and the light receiving region may be maximized.

Also, with the light emitting area occupying almost all the front surface of the lighting block, an increased area of illumination is realized and a plurality of the lighting blocks may be combined to form a large area of light illumination.

Although power consumption is increased by enlarging the light emitting area, power requirements are satisfied by an increase in the capacity of the solar cell assembly made possible by simultaneously enlarging the size of the light receiving area. An increase in the capacity of the capacitor is needed in this case, but since the capacitor is positioned behind the solar cell assembly, an increase in its size does not affect the size of the light emitting and light receiving areas.

Although embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A lighting block using solar cells, comprising:
   a case including a light transmission section, light being emitted and received through the light transmission section;
   a light emitting assembly mounted within the case adjacent an inner surface of the light transmission section, the light emitting assembly allowing transmission of sunlight through the light transmission section, wherein the light emmitting assembly includes a light guide plate mounted adjacent the inner surface of the light transmission section and light sources that irradiate light through a side wurface of the light guide plate;
   a solar cell assembly mounted within the case adjacent the light emitting assembly, the solar cell assembly receiving sunlight passing through the light transmission section and the light emitting assembly, and generating electric power;
   a capacitor installed within the case and storing the electric power generated by the solar cell assembly; and
   a controller installed within the case and controlling the supply of stored electric power to the light emitting assembly;
   wherein the light guide plaate includes a light reflecting assembly substantially parallel to the light transmission section and realized through protrusions formed on a surface of the light guide plate farthest from the light transmission section, the protrusions reflecting light from the light emitting assembly through the light transmission section.

2. The lighting block of claim 1, wherein the light guide plate is mounted in contact with a rear surface of the light transmission section or in separation from the inner surface of the light transmission section at a predetermined distance.

3. The lighting block of claim 2, wherein when the light guide plate is mounted in separation from the inner surface of the light transmission section at a predetermined distance, a transparent material is filled in the distance between the light guide plate and the inner surface of the light transmission section.

4. The lighting block of claim 3, wherein the transparent material is ethylene vinyl acetate (EVA).

5. The lighting block of claim 1, wherein the light guide plate is a transparent material.

6. The lighting block of claim 5, wherein the transparent material is one of poly carbonate, ethylene vinyl acetate (EVA), and acrylic resin including poly methyl metacrylate (PMMA).

7. The lighting block of claim 1, wherein the light guide plate includes a light scattering assembly substantially parallel to the light transmission section and realized through a surface of the light guide plate closest to the light transmission section.

8. The lighting block of claim 7, wherein the light reflecting assembly further includes a mirror sheet or a metal film.

9. The lighting block of claim 7, wherein the light scattering assembly is a light scattering sheet, with minute protrusions and depressions formed thereon by a sandblast process.

10. The lighting block of claim 1, wherein a dichroic mirror is coated on a surface of the light guide plate farthest from the light transmission section and substantially parallel to the light transmission section, the dichroic mirror selectively reflecting light of a specific wavelength.

11. The lighting block of claim 1, wherein the light sources are light-emitting apparatus including light bulbs and light-emitting diodes.

12. The lighting block of claim 1, wherein the case is made of one of glass and polycarbonate.

13. The lighting block of claim 1, wherein the solar cell assembly is realized through solar cells mounted at a predetermined distance from the light emitting assembly.

14. The lighting block of claim 1, wherein the solar cell assembly includes a plurality of solar cells.

15. The lighting block of claim 1, wherein the capacitor is electrically connected with the solar cell assembly using an electric wire.

16. The lighting block of claim 1, wherein the controller is electrically connected with the light emitting assembly using an electric wire.

* * * * *